United States Patent
Hanschke et al.

(10) Patent No.: US 12,196,110 B2
(45) Date of Patent: Jan. 14, 2025

(54) BLISK FOR A GAS TURBINE

(71) Applicant: MTU Aero Engines AG, Munich (DE)

(72) Inventors: Benjamin Hanschke, Munich (DE);
Alexander Halcoussis, Munich (DE);
Amadeusz Rekosiewicz, Munich (DE);
Moritz Thon, Munich (DE); Benjamin Linke, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/176,304

(22) Filed: Feb. 28, 2023

(65) Prior Publication Data

US 2023/0279777 A1 Sep. 7, 2023

Related U.S. Application Data

(60) Provisional application No. 63/316,443, filed on Mar. 4, 2022.

(51) Int. Cl.
*F01D 5/34* (2006.01)

(52) U.S. Cl.
CPC ............ *F01D 5/34* (2013.01); *F05D 2240/80* (2013.01)

(58) Field of Classification Search
CPC ........................................................ F01D 5/34
See application file for complete search history.

(56) References Cited

U.S. PATENT DOCUMENTS

| | | | |
|---|---|---|---|
| 6,511,294 B1 | 1/2003 | Mielke et al. | |
| 6,969,232 B2 | 11/2005 | Zess et al. | |
| 7,465,155 B2 | 12/2008 | Nguyen | |
| 8,403,645 B2 * | 3/2013 | Barnes | F01D 5/143 416/234 |
| 9,376,927 B2 | 6/2016 | Stein et al. | |
| 10,502,230 B2 * | 12/2019 | Anderson | F01D 5/143 |
| 10,577,955 B2 * | 3/2020 | Shirley | F04D 29/544 |
| 10,920,599 B2 | 2/2021 | Adhate et al. | |
| 11,118,466 B2 | 9/2021 | Duong et al. | |

(Continued)

FOREIGN PATENT DOCUMENTS

| | | |
|---|---|---|
| EP | 1087100 B1 | 4/2010 |
| EP | 3064706 A1 | 9/2016 |
| EP | 3064711 A1 | 9/2016 |

(Continued)

OTHER PUBLICATIONS

Reising, Steffen, Dissertation, "Steady and Unsteady Performance of a Transonic Compressor Stage with Non-Axisymmetric End Walls", Jul. 2010, Darmstadt, Germany, Department of Gas Turbines, Aerospace Propulsion, Darmstadt University of Technology, all pages.

*Primary Examiner* — Michael L Sehn
(74) *Attorney, Agent, or Firm* — Hinckley, Allen & Snyder, LLP; David R. Josephs

(57) ABSTRACT

The invention relates to a blisk segment for a gas turbine, comprising at least one first blade having an airfoil, a leading edge, a trailing edge, a blade root, a suction side and a pressure side, a pedestal, and a first fillet having a device for influencing crack growth. The robustness of the gas turbine is improved in accordance with the invention in that, at the leading edge of the first blade, at least on the first fillet, a first surface structure is arranged and interacts with the crack-influencing device for influencing crack growth and for flow influencing.

10 Claims, 2 Drawing Sheets

(56) References Cited

U.S. PATENT DOCUMENTS

2019/0178094 A1* 6/2019 Schutte .................. F01D 5/34
2021/0372288 A1   12/2021 Duong et al.

FOREIGN PATENT DOCUMENTS

| EP | 2730745 | B1 | 8/2017 |
| EP | 3473431 | A1 | 4/2019 |
| EP | 3480430 | A1 | 5/2019 |
| EP | 2806103 | B1 | 7/2019 |
| EP | 4130430 | A1 | 2/2023 |

* cited by examiner

BLISK FOR A GAS TURBINE

CROSS REFERENCE TO RELATED APPLICATION

This application is related to, and claims benefit from U.S. Provisional Application No. 63/316,443, filed on Mar. 4, 2022, entitled "COMBINATION OF ENDWALL CONTOURING WITH AIRFOIL PEDESTALS TO PREVENT CRACK GROWTH INTO THE DISK OF COMPRESSOR BLISKS," incorporated by reference in its entirety, herein.

BACKGROUND OF THE INVENTION

The invention relates to a blisk for a gas turbine, comprising at least one first blade having an airfoil, a leading edge, a trailing edge, a blade root, a suction side and a pressure side, a pedestal, and a first fillet having a device for influencing crack growth.

Rotors and/or blisks are arranged on an engine shaft, with which they rotate around an engine axis. To describe the geometry found in engines, therefore, three main axes are defined. The first main axis runs in the direction of the axis of rotation of the engine and is also denoted as the longitudinal or lengthwise axis that runs in the axial direction. By way of the first main axis, a front and a back of the geometry observed in each case is established, whereby the gas flow enters in front and exits in back. The second axis runs along a direction perpendicular to the axis of rotation of the engine and is also denoted the radial axis that runs in the radial direction. By way of the second main axis, an outside and an inside of the engine are defined, whereby the engine axis lies on the inside and the radial direction of the engine axis runs toward the outside. The third main axis runs in the peripheral direction perpendicular to the other two main axes and connects the meridian sections formed by the first two main axes. The three main axes together define three main planes: meridian planes that are extended from the longitudinal axis to a radial axis in each case; peripheral planes that lie on a cylinder lateral surface around the axis of rotation; and cross-sectional planes of the engine that are arranged normal to the axis of rotation of the engine.

Blades with complex three-dimensional geometry are normally described by blade profiles that are separated or graduated one on top of another and whose profile surface extensions need not necessarily lie in only one peripheral plane, but can also intersect the other main planes as curved blade profiles. This configuration is primarily owing to the aerodynamic design of the blades and the specifications for the principal flow channel, whose edges, particularly the inner shroud, need not run parallel to the main axis. The definitive form, particularly in the hub or shroud region, for structural mechanical reasons, additionally deviates from this aerodynamically optimized, particularly ideal, blade profile; in most cases, so-called fillets are arranged in this shroud region. The geometrical focal points of the aerodynamically optimized blade profiles form a graduation line, wherein the graduation line represents a measurement for the inclination (lean) of the blade.

Blade profiles are further described by a camber line running from the leading edge to the trailing edge of the blade profile, as well as by the circumferential edge lines on the blade surface that form the blade profile and typically describe a teardrop shape with suction and pressure sides.

The camber line is the profile central line from the leading edge to the trailing edge of the blade and corresponds to a connection line through all central points of circles inscribed in the blade profile. This connection line can be described in simplest approximation by concatenated or juxtaposed straight lines, but also by splines or other polynomial curves through the central points. In an axial division of the blade into one hundred parts and more, for example, by way of one hundred circles inscribed axially equidistant and corresponding connection of the central points of the circles by straight lines, a sufficient precision is achieved for the course of the camber line, which can serve as at least a first reference point for the determination of the geometric positions of the involved points.

A leading edge and trailing edge can also be formed by circular sections, since one would like to avoid sharp edges in turbomachines and specifically in the main gas channels of these turbomachines. In the following, the leading edge and trailing edge shall be reduced, however, to a line, i.e., a juxtaposition of points onto the surface of the blade. The following method serves to establish a point of this leading edge line or trailing edge line on a profile as the leading edge point or the trailing edge point. Inscribed circles can be placed up to the leading edge or the trailing edge of the blades. At the leading edge and at the trailing edge, the camber line runs from the central point of the circle of the leading edge or from the central point of the circle of the trailing edge directly in the direction to the leading edge or trailing edge. In good approximation, this direction corresponds to the direction of the connection line for the next-to-last to the last circle central points of the respective inscribed circles, since in this region, a steady and converging course of the camber line is to be expected, when the central points of the circles lie sufficiently close to one another, i.e., when the separation or graduation of the geometric points being observed is sufficiently close or fine. This definition serves for determining the leading edge and trailing edge, particularly in the case of unknown blade geometry, i.e., not taken from existing data of the design relative to the blade geometry. A straight line extended from the leading edge to the trailing edge is designated the chord of the blade. If nothing is indicated to the contrary, data that is referred to the chord length is to be understood as surface points of the overlying or underlying structure projected onto the chord length in or opposite to the peripheral direction.

For determining the quantitative values, it is viewed as sufficiently approximated, if the position of the points to be determined for the corresponding blade size (axial extension, radial extension, peripheral extension) can be accurately determined on at least one-twentieth of the extension of the blade in the corresponding spatial direction. If there are points of reference given for this, that a smaller separation or graduation would be necessary or geometries that are being observed are very close together, to reach values named in this description and in the claims, this approximation should be correspondingly refined.

The largest possible circle diameter between profile suction side and profile pressure side is designated as the maximum profile thickness for a profile, wherein the central point of this largest circle is arranged on the camber line. A connection surface to a rotor hub or to a rotor shroud is designated a blade root.

Since one tries to keep swirl effects or turbulence and thus losses in engines as small as possible and to prevent or distribute unwanted stresses in the material of the blades and the platform of the disk, which is also designated as the hub, the rotor hub, the shroud or the inner shroud, so that the unwanted stresses are non-damaging, the transitions from the blade to the pedestal in the region of the blade root are configured as constant as possible by providing a fillet. Due to the fact that geometries deviating from the aerodynamically ideal or optimized blade profile do arise, so that the precise position of the leading edge and trailing edge may possibly no longer be determined clearly by the above-described procedure, the circular shapes of the ends of the blade at the leading edge and at the trailing edge are resolved by the presence of a fillet, thus a form of the blade that deviates from an aerodynamically optimized form. What makes it even more difficult is that the blade profiles calculated for the design are not defined along a cylindrical peripheral plane, but may intersect this plane. Further, in the region of the blade root, the pedestal or hub or shroud contouring (Eng.: "endwall contouring") of the basic rotor body can be adapted to the flow, which in turn complicates finding the beginning of the fillet.

In determining the values of such a blade being measured, particularly of a connection structure such as a fillet, the surfaces of the blade and of the pedestal as well as of the transition, to the fillet, can be optically measured, for example, between blade and pedestal. The precise position of the leading edge and the trailing edge, the precise connection region from the aerodynamically ideal profile to a fillet, and the connection region from the fillet to the pedestal of the rotor disk, however, can only be determined with difficulty. Inner-lying values are usually not known and the transitions at the surface from the airfoil to the fillet, which will be designated in the following as the blade connection, and further to the pedestal of the blisk or rotor disk, which will be designated in the following as the pedestal connection, are usually constant, based on the aerodynamic shape of the blade. That is, a precise transition point without knowledge of the flow and the design or dimensioning point of the blades is also precisely determined only with difficulty.

First, in order to make possible to a good approximation a determination of the quantitative values of blades to be measured without sufficiently knowing the aerodynamic conditions and the design considerations, sections through the blade, which lie in one of the main planes, are used, wherein a graduation of distances results for the approximate determination of the observed geometries along the three main axes, in each case, by at least one one-hundredth of the largest lengthwise extension of the blade, the largest radial extension of the blade, and the largest peripheral extension of the blade. In other words, a grid (analogous to a grid in a finite elements method, abbreviated FEM) with a fineness in each case of at least twenty steps in all three main directions, namely between the frontmost and backmost points of the blade, the furthest inner-lying and outer-lying points of the blade, as well as between the points of the blade lying the furthest from one another will be produced.

The largest peripheral and axial extensions of the blade are to be expected at the pedestal, since the connection region, the fillet, from the blade root to the basic rotor body, are found there and the blade root has the greatest extension.

In order to determine the axial beginning and the axial end, thus the connection points, of the fillet in the axial direction, the contour of the surface in the region of the pedestal should be observed. If a depression of the pedestal is present in the axial direction or opposite to the axial direction adjacent to the connection region, then the connection point of the fillet to the pedestal will be an inflection point of the surface. If an elevation of the pedestal is present in the axial direction or opposite to the axial direction, then the connection point will be a minimum radial distance of the surface to the rotational axis of the rotor. If an extension having a straight course for the pedestal is present in the observed plane, then the connection point will be defined by the beginning of a curvature.

In order to determine the peripheral beginning or the peripheral end of the fillet in the peripheral direction, the contour of the surface in the region of the pedestal should be observed. A transition from the surface of the pedestal to a connection structure, for example a fillet, can be expected in a region in which the curvature of the surface changes. If, in or opposite to the peripheral direction, there is a depression present adjacent to the expected region in which the transition is to be found, then the transition point of the fillet to the pedestal will be an inflection point of the surface. If an elevation of the pedestal is present in the peripheral direction or opposite to the axial direction, then the transition point will be a minimum radial distance of the surface to the rotational axis of the rotor. If an extension of the pedestal having a straight course is present in the observed plane, then the transition point will be defined by the beginning of a curvature.

The axial beginning and the axial end of the fillet as well as the peripheral beginning and the peripheral end of the fillet, are each points that have a radial distance to the axis of rotation of the turbomachine. A peripheral plane can be defined as a cylinder lateral surface by way of those of these points having the shortest radial distance, this surface defining an auxiliary shroud of the pedestal in the following, and serves in a first approximation as a point of contact or connection point for the determination of the radial extension of the blade, thus also the maximum radial extension.

The maximum radial extension of the airfoil can then be formed alternatively by forming another cylinder around the rotational axis of the engine, whose lateral surface intersects only a single point of the blade, namely the outermost point.

The graduations or grid for determining all values of the blade, such as indicated above, particularly a grid whose edge lengths each have one-twentieth or less of the maximum lengthwise extension, radial extension, and peripheral extension of the blade can be derived from these maximum extensions. The fineness of the grid should be dependent on the values being considered, in order to be able to produce a comparison with the values with sufficient reliability.

In order to determine a connection point from the airfoil to a connection structure, for example a fillet, of the airfoil to the pedestal, in the case of unknown flow conditions or without knowing the underlying structural-mechanical considerations, the blade is enclosed in a grid subdivision of the meridian planes, the cross-sectional planes, as well as the peripheral planes, as described above. Then, for the determination of the connection points from airfoil to the connection structure, in a first approximation those points of the blade surface in the region, in which the beginning of the connection structure is to be expected, are determined, points which have a greater change in curvature when compared to at least one radially outer and one radially inner neighboring point, when observed along the surface. One proceeds analogously for determining the connection points from the connection structure to the pedestal, wherein here, the adjacent points on the surface of the blade or the pedestal, both in the axial direction as well as the peripheral direction, are drawn on for the comparison of the change in curvature.

After determining the connection regions, the measured surfaces as well as beginning and end of the connection structure in the radial direction should now be known. An expansion line, which can also be designated as an extrusion line, of the straight lines drawn on for determining the leading edge or trailing edge can be generated in the respective peripheral plane of the leading edge or the trailing edge. A line in the radial direction can be projected onto the connection structure up to the blade root from this extrusion line, and this radial line shall serve as the leading edge or trailing edge on the connection structure in the following. In cases in which the blades and the connection structures thereof are intersected based on a geometric limitation of the disk in the axial direction, there can be two leading edges or trailing edges in this region, from which the corresponding other values for describing the connection structure are to be determined. In each case, at least twenty grid points can be placed along each of the connection regions, each time between leading edge and trailing edge, wherein two opposite-lying points of both connection regions arranged on either the suction side or the pressure side are connected along the measured surface, so that a correspondingly fine subdivision of the connection structure is made possible. From this, the expansions of the regions of the connection structure, i.e., of the fillet and the variants thereof, which are described in this Application, can be determined, at least in a first approximation.

In the above-described method for determining the values and positions, first approximation methods are involved so as to be able to classify an unknown blade. An examination should be undertaken if required in a further step, based as much as possible on the precise geometry and the knowledge of the connections. Drawing upon actual values, for example from design drawings, supplies more precise results.

SUMMARY OF THE INVENTION

It is the object of the invention to provide a blisk that improves the robustness of the gas turbine.

A blisk according to the invention, particularly a compressor blisk, for a gas turbine comprises at least one first blade having an airfoil, a leading edge, a trailing edge, a blade root, a suction side and a pressure side, a pedestal and/or an annular space (also called an endwall) of the blisk, and a first fillet, which connects the first blade with the pedestal. The object is achieved by the blisk according to the invention in that a first surface structure is arranged on the leading edge of the first blade at least on the first fillet and brings about an influence on crack growth and a flow influence. A specific arrangement of a surface structure on the fillet and thus a specific formation of a fillet surface owing to the surface structure make it possible to improve both the stability of the blade-pedestal connection, particularly of the fillet, and accordingly of the gas turbine in an advantageous manner. Especially advantageous is the formation of the surface structure in a lower region of the fillet, particularly in a pedestal region of the fillet, that is arranged at a distance from the pedestal of at most 40%, particularly at most 35%, especially preferred at most 30% of a crosswise extension of the fillet. A surface structure can be formed with respect to a nominal geometry and can be formed as an elevation, that is, as a kind of mound or bulge (also called a patch), with respect to the nominal geometry. In other words, the surface structure can represent a thickening or material reinforcement in a region of the fillet in front of the leading edge (inlet edge), that is, an arrangement extending the leading edge. The nominal geometry can be defined by a peripheral surface of the pedestal (corresponding to the radial outer surface of the blisk disk or by the simple curvature of the fillet with a crack-influencing device. In this case, a surface structure can be bounded, for example, by a line of transition between the surrounding surface curvature and its own surface curvature. These definitions apply not only to the first surface structure, but also to the other surface structures described in detail further below.

Further advantages and features ensue from the following description of several preferred exemplary embodiments as well as from the dependent claims.

In a first advantageous embodiment of the blisk, the first fillet has a crack-influencing device. Such a crack-influencing device makes it possible to influence or divert incipient cracks in such a way that they do not migrate into the blisk disk, but rather propagate only in the airfoil. Furthermore, it is possible in the case of a combination of a crack-influencing device and a surface structure described above to take into full account the aerodynamic constraints in an advantageous manner, when they need to be placed in the background on account of the structural-mechanical constraints for the crack-influencing device; that is, there results a synergistic effect consisting of structural-mechanical and aerodynamic optimization. The surface structure can be formed on the fillet at least in those regions in which the crack-influencing device is also formed in crosswise extension of the fillet.

In accordance with another preferred further development, the crack-influencing device can be formed at least in a front region of the fillet, said front region extending in front of a leading edge and around 30% of the longitudinal extension of the fillet from the leading edge of the airfoil in the direction of a trailing edge, with the first surface structure being arranged in the front region of the fillet. Trials have shown that the front region on the blades of the blisk, particularly of a compressor blisk, is the region in the annular space subjected most strongly to structural load, so that a surface structure arranged there can contribute to a reduction and/or a distribution of local stresses in the component and thereby increase the stability of the component.

In an advantageous further development of the invention, the crack-influencing device, at least in a first segment, is a region that is arranged in the middle in crosswise extension of the fillet and in which a minimum radius of the fillet is formed and that is arranged at a distance from the pedestal of at least 30%, particularly at least 35%, especially preferred at least 40%, of the crosswise extension of the fillet, with the first surface structure being a surface elevation that is raised with respect to adjacent surfaces. It is possible in this way, on the one hand, to utilize the flow space released on account of the crack-influencing device for a reinforcement of the blisk and, on the other hand, to distribute the forces emanating from the blade onto the surface of the pedestal.

In a further embodiment of the blisk, it is provided that the crack-influencing device is a platform of the fillet and that the first surface structure is a surface depression, which is recessed with respect to adjacent surfaces. In this way, it is possible in an advantageous manner to compensate for the reduction in the annular space introduced by the crack-influencing device, so that, when compared to a blisk without a crack-influencing device, an at least equivalent or increased mass flow can flow through the annular space.

In another embodiment, the blisk can be further developed in such a way that the first surface structure is arranged in a pressure-side, front region of the first blade in the axial direction in front of a leading edge of the airfoil of the first blade.

In another embodiment, it can further be provided that the first surface structure extends onto the pedestal. The extension can be produced in the direction towards a further blade and/or in the direction of the trailing edge of the blade. A surface structure on the pedestal has the advantage that it is possible to diminish stresses there and to be able to influence the flow. Furthermore, it is possible to direct and distribute forces even better. Furthermore, it is possible, for example, to attenuate in a specific manner flows at the blade root that give rise to swirling.

Furthermore, in an embodiment, the blisk can be further developed in such a way that a first further surface structure is arranged at least on the fillet on the suction side in a region between 5% and 95%, particularly 30% and 70%, of the chord length of the first blade, as measured at the maximum height of a blade connection between the fillet and the airfoil. The first further surface structure can also be spaced apart from the leading edge of the blisk on the suction side by at least 5%, 10%, 15%, 20%, 25%, 30%, 35%, 40%, 45%, 50%, 55%, 60%, 65%, 70% of the chord length of the first blade. Additionally or alternatively, the first further surface structure can also be spaced apart from the trailing edge of the blisk on the suction side by at least 5%, 10%, 15%, 20%, 25%, 30%, 35%, 40%, 45%, 50%, 55%, 60%, 65%, 70% of the chord length of the first blade. The first further surface structure can also extend onto the pedestal. The provision of a further surface structure in the middle region of the blade on the suction side can influence a suction-side stress in the blisk in a favorable manner.

Additionally, it can be provided that, at least in a middle region of the fillet, said middle region extending from between 5% and 95%, particularly 30% to 70%, of the longitudinal extension of the fillet, the crack-influencing device is a region that is arranged in the middle in crosswise extension of the fillet and in which a minimum radius of the fillet is formed and that is at a distance from the pedestal of at least 5%, 10%, 15%, 20%, 25%, 30%, particularly at least 35%, 40%, or 45%, of the crosswise extension of the fillet, and that the first further surface structure is a surface elevation that is raised with respect to the adjacent surface. In this way, it is possible for the surface on the suction side to absorb larger forces, resulting in smaller stresses in the blisk. The middle region can extend along the longitudinal extension of the fillet starting from the leading edge of the blisk at least 5%, 10%, 15%, 20%, 25%, 30%, 35%, 40%, 45%, 50%, 55%, 60%, 65%, 70% of the longitudinal extension of the fillet. Additionally or alternatively, the middle region can extend along the longitudinal extension of the fillet starting from the trailing edge of the blisk at least 5%, 10%, 15%, 20%, 25%, 30%, 35%, 40%, 45%, 50%, 55%, 60%, 65%, 70% of the longitudinal extension of the fillet.

Alternatively, it can be provided that, at least in a middle region of the fillet, said middle region extending from 5% to 95% of the longitudinal extension of the fillet, the crack-influencing device is a platform of the fillet and that the first surface structure is a surface depression, which is recessed with respect to the adjacent surface. In this way, on the one hand, the flow space is enlarged, so that a larger mass flow can be carried through the flow space, and, on the other hand, forces are better distributed in the fillet around the point of the greatest blade thickness. The middle region can extend along the longitudinal extension of the fillet starting from the leading edge of the blisk at least 5%, 10%, 15%, 20%, 25%, 30%, 35%, 40%, 45%, 50%, 55%, 60%, 65%, 70% of the longitudinal extension of the fillet. Additionally or alternatively, the middle region can extend along the longitudinal extension of the fillet starting from the trailing edge of the blisk at least 5%, 10%, 15%, 20%, 25%, 30%, 35%, 40%, 45%, 50%, 55%, 60%, 65%, 70% of the longitudinal extension of the fillet.

Moreover, the blisk can be arranged advantageously such that at least one second blade, which is adjacent to the first blade and has an airfoil, a leading edge, a trailing edge, a blade root, and a suction side and a pressure side, is arranged on the pedestal and is connected to the pedestal with a second fillet comprising a second crack-influencing device and that, at the leading edge of the second blade, at least on the second fillet, a second surface structure is arranged and interacts together with the crack-influencing device for crack influencing and for flow influencing and is different from the first surface structure, with the second surface structure having a lesser elevation, when the first surface structure is elevated with respect to the adjacent surfaces, or having a lesser depression than the first surface structure, when the first surface structure is recessed with respect to adjacent surfaces, and/or that a second further surface structure is arranged at least on the second fillet on the suction side in a region between 5% and 95% of the chord length of the second blade, as measured at the maximum height of a blade connection between the second fillet and the airfoil of the second blade, and is different from a first further surface structure, with the second further surface structure having a lesser elevation or a lesser depression than the first further surface structure, and/or that, between the first blade and the second blade on the pedestal and/or on the first fillet and/or the second fillet, a trough-shaped depression is arranged. The provision of analogous second surface structures on a further adjacent blade that are different from the first surface structures makes it possible in a simple manner to prevent any resonant vibration, which would arise in the case of structures on each of the blades that were always the same. This can also be achieved advantageously in that, between the two blades, an additional trough-shaped depression is provided. The second further surface structure can also be spaced apart from the leading edge of the blisk on the suction side by at least 5%, 10%, 15%, 20%, 25%, 30%, 35%, 40%, 45%, 50%, 55%, 60%, 65%, 70% of the chord length of the second blade. Additionally or alternatively, the second further surface structure can also be spaced apart from the trailing edge of the blisk on the suction side by at least 5%, 10%, 15%, 20%, 25%, 30%, 35%, 40%, 45%, 50%, 55%, 60%, 65%, 70% of the chord length of the second blade.

The features described above describe a first blisk segment of the blisk according to the invention.

Provided in another aspect of the invention, furthermore, is a blisk that can have further blisk segments arranged adjacent to the at least one first blisk segment, with the further blisk segments being formed identically to the at least one blisk segment or else being formed differently from it. In this way, it is possible to provide further surface structures on or between further blades of further blisk segments that differ from the surface structures of the at least one blisk segment. It is possible in this way to counteract any resonance behavior in an advantageous manner.

BRIEF DESCRIPTION OF THE DRAWING FIGURES

The invention is explained in detail in regard to the following drawings on the basis of several preferred exemplary embodiments of the invention.

DESCRIPTION OF THE INVENTION

Figure 1:
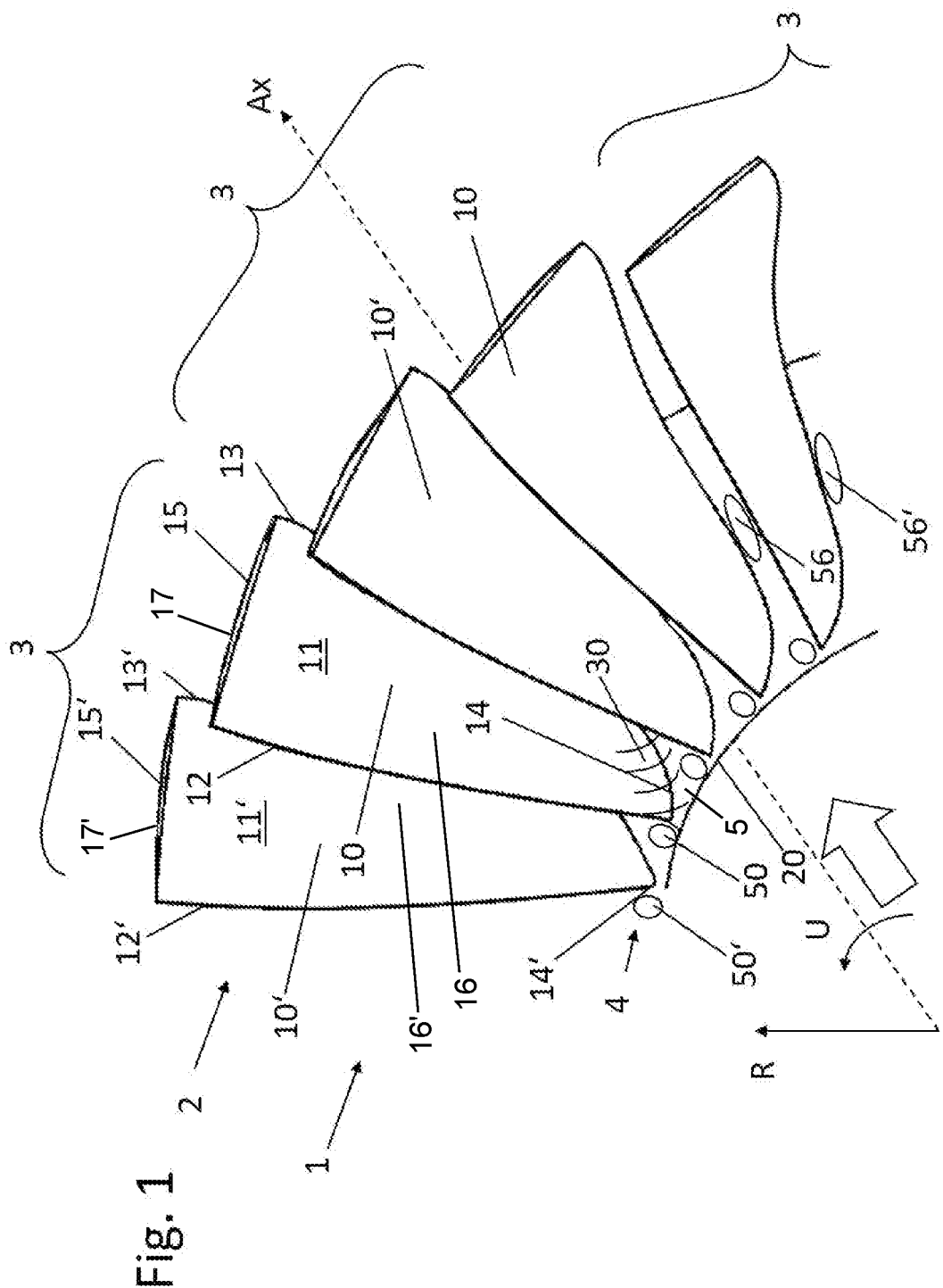
FIG. 1 shows a cutout of a blisk having an exemplary embodiment of a blisk according to the invention in a perspective view.

Illustrated in FIG. 1 is a segment of an exemplary embodiment of a blisk 2 according to the invention in a perspective view. The blisk 2 is arranged in a gas turbine 1 for an aircraft engine, with the gas turbine 1 in FIG. 1 being indicated by its three main axes Ax, R, U. The three main axes extend in the axial direction Ax, the radial direction R, and the peripheral direction U. The blisk 2 serves as a rotor in a compressor of the gas turbine 1.

The blisk 2 comprises a blisk disk 4 and a plurality of blades 10, 10', referred to as rotating blades, arranged on the blisk disk 4, two of which in the present exemplary embodiment being assigned to a blisk segment 3. A plurality of such blisk segments 3 are arranged here adjacent to one another in the peripheral direction U and extend over a pedestal portion with, in each instance, a first blade 10 and a second blade 10', which, in the present exemplary embodiment, differ from each other in at least one characteristic, so that the different characteristics of different sectors of the blisk 2 change the vibrational behavior of the blisk 2. This characteristic can lie in the blade itself, in the fillet 30, 30' connecting the blade 10, 10' with the pedestal 20, and/or in a surface structure 50, 50', 56, 56' deviating from a nominal geometry. Unless otherwise stated, the discussions in regard to a blade, in regard to a fillet, and in regard to a surface structure also apply to the other blade and the other fillet and/or the other surface structures.

The blades 10, 10' are arranged spaced apart from each other in the peripheral direction U on a pedestal surface 22 of a pedestal 20 of the blisk disk 4. The blades 10, 10', the pedestal 20, and the fillet 30, 30', which, in each instance, connects one of the blades 10, 10' and the pedestal 20, together form a blade-pedestal connection 5. The blades 10, 10' have an airfoil 11, 11' for absorbing aerodynamic forces, a blade root 14, 14' for attachment to the pedestal surface 20, and a blade tip 15, 15' directed towards an annular-space wall of the gas turbine 1. The blisk 2 rotates in the peripheral direction U, with, in each instance, a suction side 16, 16' of the respective blade 10, 10' being arranged opposite to the direction of rotation and a pressure side 17, 17' of the respective blade 10, 10' being arranged in the direction of rotation of the blisk 2. The suction sides and pressure sides 16, 17, 16', 17' each extend here from a leading edge 12, 12' to a trailing edge 13, 13' of the respective blade 10, 10'.

At the respective blade root 14, 14', in a pressure-side, front region 31, 31' of the fillet 30, 30', a surface structure 50, 50' is arranged on the fillet 30, 30' in each instance, with the surface structure 50, 50' extending from the fillet 30, 30' onto the pedestal 20. The surface structure 50, 50' interacts structurally and aerodynamically with a crack-influencing device 40, 40'—which is explained in detail in FIG. 2—on the fillet 30, 30'.

Furthermore, in the first exemplary embodiment, at the respective blade root 14, 14', a surface structure 50, 50' is arranged in each instance on the respective fillet 30, 30' in a middle region on the suction side of the fillet 30, 30', with the surface structure 50, 50' extending from the fillet 30, 30' onto the pedestal 20.

Figure 2:
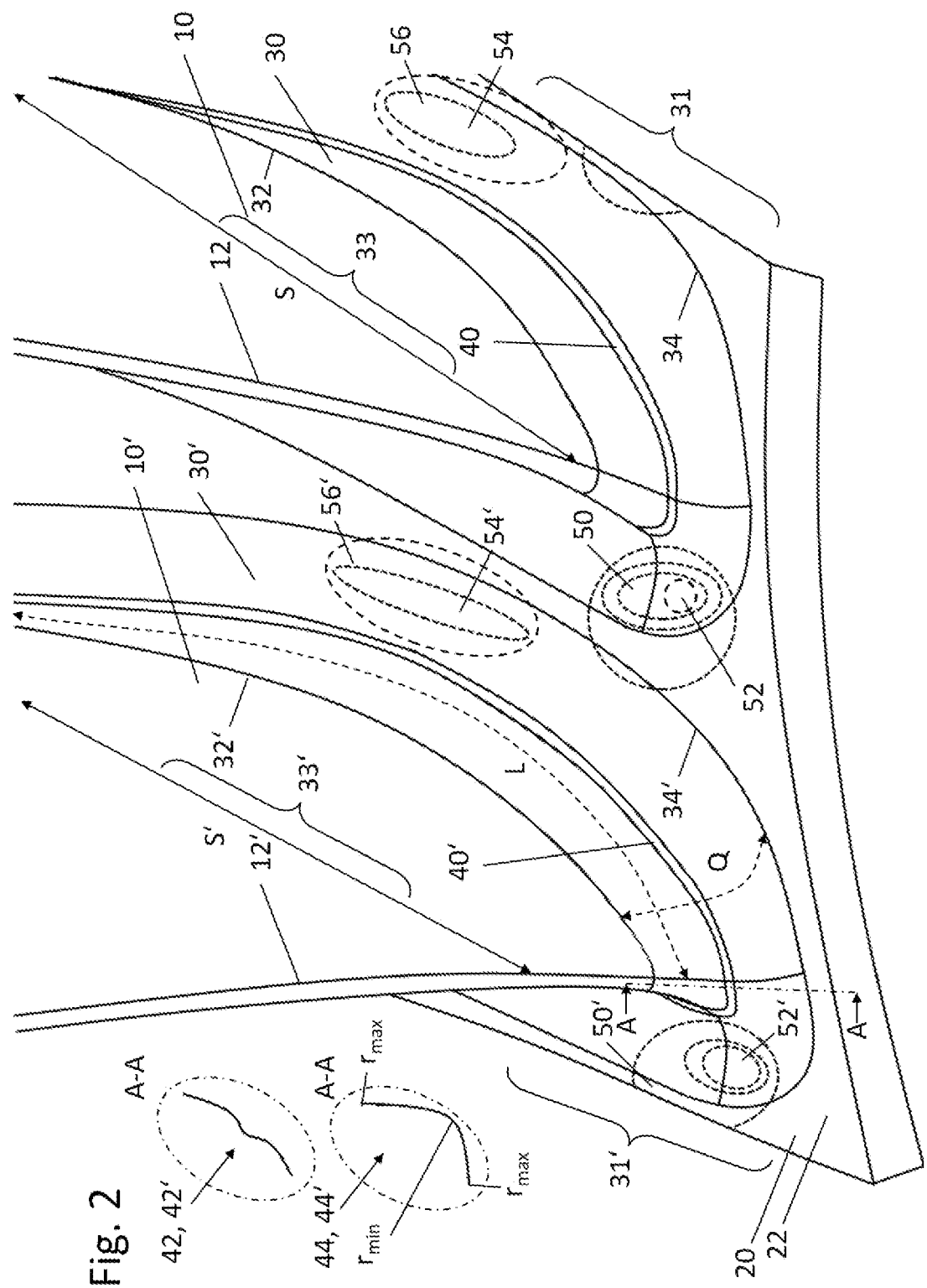
FIG. 2 shows the exemplary embodiment of the blisk according to the invention in an enlarged perspective view and with more details.

Illustrated in FIG. 2 in perspective view is a single blisk segment 3 from FIG. 1. Shown is a first blade 10 and a second blade 10', the two of which are connected integrally to the pedestal 20 by a fillet 30, 30' on their respective blade root 14, 14'. Each fillet 30, 30' has a crack-influencing device 40, 40', with a section A-A through the fillet 30' of the second blade 10' being depicted, through which section A-A two types of crack-influencing device 40, 40' are clearly depicted at the top left of the drawing. It is obvious that, in an exemplary embodiment of the invention, the crack-influencing device 40, 40' of the two blades 10, 10' is of the same type, with it being possible for the type to vary along the blade. The first type is a fillet 30, 30' having a platform 42, 42', which acts as a crack-influencing device 40, 40'. The second type has a region that is spaced apart from the pedestal 20 by at least 30% of the crosswise extension Q of the fillet 30, 30' and has a minimum radius $r_{min}$ of the fillet 30, 30'. The minimum radius $r_{min}$ is arranged here between two different maximum radii $r_{max}$ of the fillet 30, 30', which are arranged at a blade connection 32, 32' or a pedestal connection 34, 34'.

The fillet 30, 30' extends from the leading edge 12, 12' of the blade 10, 10' to the trailing edge 13, 13' along its longitudinal extension L. Crosswise to the longitudinal extension is a crosswise extension Q of the fillet 30, 30' between a blade connection 32, 32' and a pedestal connection 34, 34'.

Arranged in the front region 31, 31' is a first surface structure 50, 50', which is depicted with dashed height lines and which extends starting from the fillet 30, 30' to the pedestal 20. In this case, the front region extends from the fillet 30, 30' in front of the leading edge 12, 12' up to 30% in longitudinal extension of the fillet in back of the leading edge 12, 12' at the blade connection 32, 32'. The first surface structure 50, 50' can extend onto the adjacent fillet 30, 30' of a suction side 16 of an adjacent blade 10.

In the case that the crack-influencing device 40, 40' in this front region 31, 31' is a platform 42, 42', the surface structure 50, 50' in the present exemplary embodiment is then a depression, particularly a trough-shaped depression. In this way, it is possible to compensate for the volume of the flow space, so that the mass flow through the flow channel of the gas turbine 1 is not influenced.

In the case that the crack-influencing device 40, 40' in this front region 31, 31' is a middle region 44, 44' with a minimum radius $r_{min}$, as described above, the surface structure 50, 50' is an elevation.

It can be seen that the first surface structure 50 on the first blade 10 is formed differently from the second surface structure 50' on the second blade 10'. Accordingly, the first surface structure 50 can be a larger depression or elevation than the second surface structure 50'. In this way, a changing stress resistance—in the present embodiment, an alternating stress resistance—is introduced into the blisk along the peripheral direction U.

Furthermore, at the respective blade root 14, 14' on the suction side in a region 33, 33' between 30% and 70% of the chord length S, S' of the blade 10, 10', a further surface structure 56, 56' is arranged in each instance on the respective fillet 30, 30', with, in the present exemplary embodiment, the surface structure 50, 50' extending from the fillet 30, 30' onto the pedestal 20.

Analogously to the first surface structure 50, 50', the further surface structure 56, 56' can be a depression in the present exemplary embodiment in the case that the crack-influencing device 40, 40' in the region 33, 33' between 30% and 70% of the chord length S, S' is a platform 42, 42'. In the case that the crack-influencing device 40, 40' in the region 33, 33' between 30% and 70% of the chord length S, S' is a middle region 44, 44' with a minimal radius $r_{min}$, as described above, the further surface structure 56, 56' can be an elevation.

What is claimed is:

1. A compressor blisk for a gas turbine, comprising a compressor blisk disk, at least one first blade having an airfoil, a leading edge, a trailing edge, a blade root, a suction side and a pressure side, the at least one first blade being connected integrally to the compressor blisk disk, and
a first concave fillet having a concave surface, which connects the first blade with a pedestal or an annular space,
wherein a first surface structure is arranged at the leading edge of the first blade, at least on the first fillet, the first surface structure being a surface elevation, which is elevated with respect to adjacent surfaces and wherein a highest point of elevation of the first surface structure is arranged on the concave surface of the fillet.

2. The compressor blisk according to claim 1, further comprising a region in the first fillet, wherein the region in the first fillet is configured and arranged to interact with the first surface structure to influence crack growth and gas flow.

3. The compressor blisk according to claim 2, wherein the region in the first fillet is formed at least in a front of the first fillet, said front of the first fillet extending in front of the leading edge and around 30% of the longitudinal extension of the first fillet from the leading edge of the airfoil in the direction of the trailing edge, and wherein the first surface structure is arranged in the front of the first fillet.

4. The compressor blisk according to claim 2, wherein the region in the first fillet, at least in a first segment, is arranged in a middle in crosswise extension of the first fillet and in which a minimum radius of the first fillet is formed and which is at a distance from the pedestal of at least 30% of the crosswise extension of the first fillet.

5. The compressor blisk according to claim 2, wherein a first further surface structure is arranged, at least on the first fillet, on the suction side in a region between 5% and 95% of the chord length of the first blade, as measured at the maximum height of a blade connection between the first fillet and the airfoil.

6. The compressor blisk according to claim 5, wherein, at least in a middle region of the first fillet, said middle region extending 5% to 95% of the longitudinal extension of the first fillet, the region in the first fillet is arranged in the middle in a crosswise extension of the first fillet and in which a minimum radius of the first fillet is formed and which is at a distance from the pedestal of at least 30% of the crosswise extension of the first fillet, and in that the first further surface structure is a surface depression, which is recessed, respectively, with respect to the adjacent surface.

7. The compressor blisk according to claim 5, wherein the region in the first fillet is a platform, at least in a middle region thereof extending 5% to 95% of the longitudinal extension of the first fillet, and in that the first surface structure is a surface elevation and/or a surface depression, which is elevated or recessed, respectively, with respect to the adjacent surface.

8. The compressor blisk according to claim 2, wherein at least one second blade, which is adjacent to the first blade and has an airfoil, a leading edge, a trailing edge, a blade root, a suction side, and a pressure side, is arranged on the pedestal and is connected with the pedestal by a second fillet comprising a second region in the second fillet, the at least one second blade being integrally connected to the compressor blisk disk, and
wherein, at the leading edge of the second blade, at least on the second fillet, a second surface structure is arranged and interacts with the second region in the second fillet for influencing crack growth and for flow influencing, and is different from the first surface structure, and wherein the second surface structure has a smaller elevation, when the first surface structure is elevated with respect to the adjacent surfaces, or has a smaller depression than the first surface structure, when the first surface structure is more recessed with respect to the adjacent surfaces, and/or
wherein a second further surface structure is arranged at least on the second fillet on the suction side in a region between 5% and 95% of the chord length of the second blade, as measured at the maximum height of a blade connection between the second fillet and the airfoil of the second blade, and is different from a first further surface structure, and wherein the second further surface structure has a smaller elevation or a smaller depression than the first further surface structure, and/or
wherein, between the first blade and the second blade, a trough-shaped depression is arranged on the pedestal and/or on the first fillet and/or on the second fillet.

9. The compressor blisk according to claim 1, wherein the first surface structure is arranged in a pressure-side, front region of the first blade in the axial direction in front of the leading edge of the airfoil of the first blade.

10. The compressor blisk according to claim 1, wherein the first surface structure extends onto the pedestal.

* * * * *